May 17, 1932.  J. LELL  1,858,514
COUPLING DEVICE
Filed July 14, 1928    2 Sheets-Sheet 1
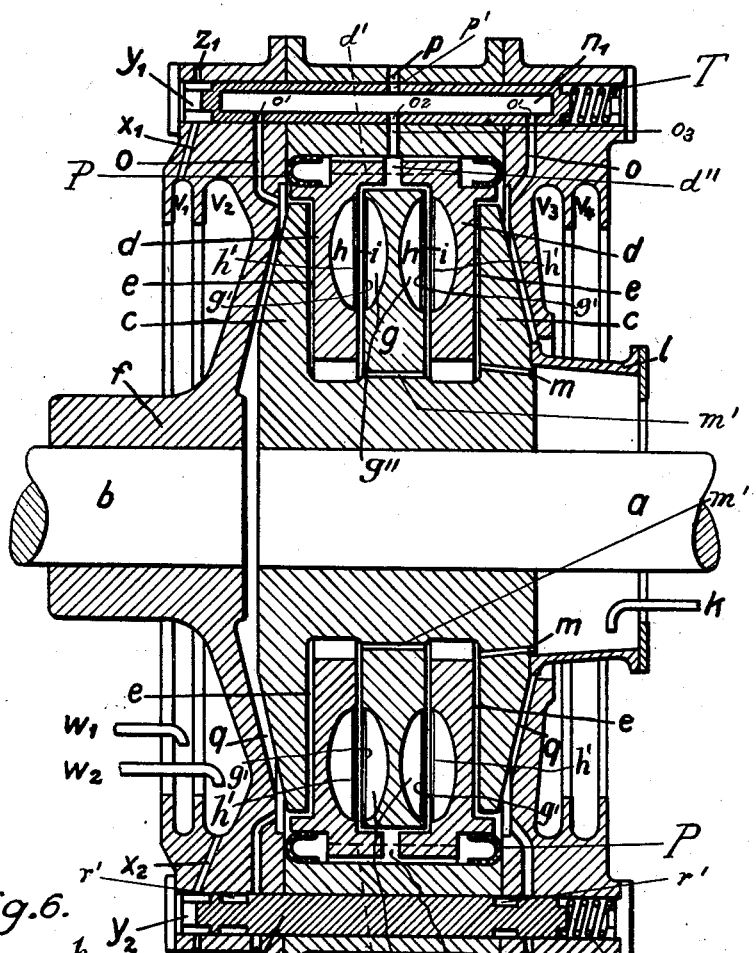
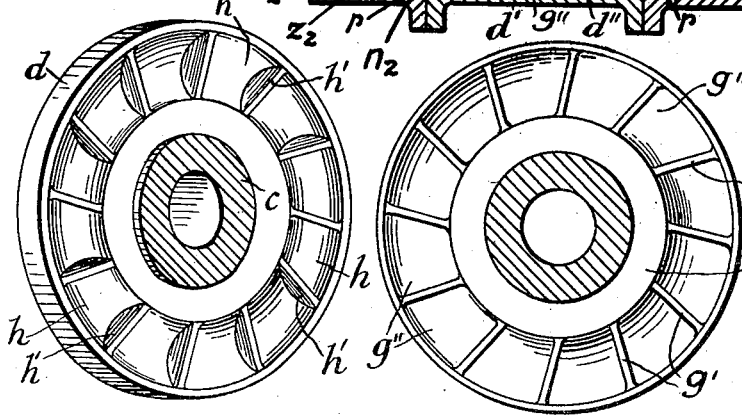
Jacob Lell
by C. P. Goepel
his Attorney Patented May 17, 1932

1,858,514

UNITED STATES PATENT OFFICE

JACOB LELL, OF HEIDENHEIM-ON-THE-BRENZ, GERMANY, ASSIGNOR TO J. M. VOITH, OF HEIDENHEIM-ON-THE-BRENZ, GERMANY, A CORPORATION OF GERMANY

COUPLING DEVICE

Application filed July 14, 1928, Serial No. 292,717, and in Germany July 14, 1927.

This invention relates to improvements in coupling devices; especially coupling devices for transmitting great power, and capable of being thrown into and out of action without interrupting the operation of the apparatus associated therewith.

An object of the invention is to provide a coupling device which is operated by a fluid controlled by the device to produce the desired result.

A further object of the invention is to provide a coupling device of such design that the members thereof can be connected by the action of a fluid which is supplied without being previously compressed and disconnected, upon withdrawal of the fluid, in an easy and safe manner.

In its preferred form the device is constructed of parts having surfaces to be moved into frictional contact; and contains spaces or channels for the fluid, so that said parts can be caused to engage; together with valves arranged to direct the fluid in the proper manner, and subsequently to discharge the fluid from the device. As herein shown, the valves are disposed at the circumference of the device and may be worked in any suitable way. The arrangement of the valves is such that in one position thereof, the fluid fills said spaces or channels, and acts by centrifugal force to connect the aforesaid parts; and in another position, the spaces or chambers are emptied and said parts are then disconnected or released.

The valves comprise a valve to admit the fluid, a valve to cause the parts to effect engagement, so that the device can operate; a valve to prepare for disconnecting the parts of the device, and a valve through which the disconnection is accomplished.

These valves may also be actuated by a fluid and the coupling device will then be further provided with channels and spaces for the flow of the fluid to the valves, these channels and spaces being so arranged that this fluid, too, works by centrifugal force derived from the revolution of the device. The other objects and advantages of the invention are set forth fully in the description, and the novel features are defined in the appended claims.

But the disclosure is of course to be taken as explanatory only and changes in shape, size, arrangement of parts and mode of operation may be made without departing from the principle of the invention or exceeding the scope and meaning of the broad terms in which the claims are expressed.

On the drawings,—

Figure 1 is an axial section on line 1—1 of Figure 3;

Fig. 5 is a partial section and plan, showing the vane-like wheel construction of the flange formed on the head carried by the driving shaft; and Fig. 6 is a perspective view of one of the friction elements, showing the vane-like wheel construction of one face thereof.

The same characters of reference identify the same parts throughout.

In the particular description of what the drawings illustrate, the letter $a$ is used to indicate the driving shaft; $b$ the driven shaft, $c$ is a head which is fixed on the driving shaft; and $d$ are friction elements movable axially of the device, but rotatable with the driven shaft $b$; at $e$ are spaces in the head $c$ for the elements $d$ and at $f$ is a member, fixed to the driven shaft $b$, and containing the slidable elements $d$, which have keyed connection to the member $f$ as shown at $d'$. This member $f$ envelopes the member $c$, and carries the valves, to be mentioned later.

Letter $g$ indicates a flange or collar, rigid with the head $c$ and the spaces $e$ may be grooves or channels in the head between the collar or flange $g$ and the ends of the head $c$, receiving the elements $d$; which may be annular or ring-shaped. The keyed connection of the elements $d$ to the member $f$ is at the circumference of the elements $d$, and these elements can thus move towards and from the collar $g$.

The flange or collar $g$, rigid with the head $c$ for rotation therewith, is made in the form of a paddle-bucket or vane wheel, each of its sides or faces including a series of angularly inclined vanes $g'$ alternating with fluid spaces or pockets $g''$, as shown in Fig. 5. At the opposite sides of the flange $g$, the elements $d$ are of a similar construction, the face of each of these elements, where it opposes the vanes and spaces of the flange $g$, being made with alternating vanes and fluid pockets $h'$ and $h$, as shown in Fig. 6. At $i$ are the spaces between the flange $g$ and the elements $d$ when these parts are separated.

Oil or other working fluid is supplied through a pipe $k$, delivered to a ring 1 affixed to the member $c$. This ring contracts somewhat toward its open end; that is, it is wider where it connects to the member $c$, and this member has ducts or channels $m$, to lead the oil inside the coupling to the nearest space $e$. Thence the fluid can flow around the edge of the flange $g$, or thru $m'$, and between same and the elements $d$, into the next space $e$. At $n1$, $n2$, $n3$, and $n4$ are the valves for the control of the fluid in the coupling device.

Figure 2:
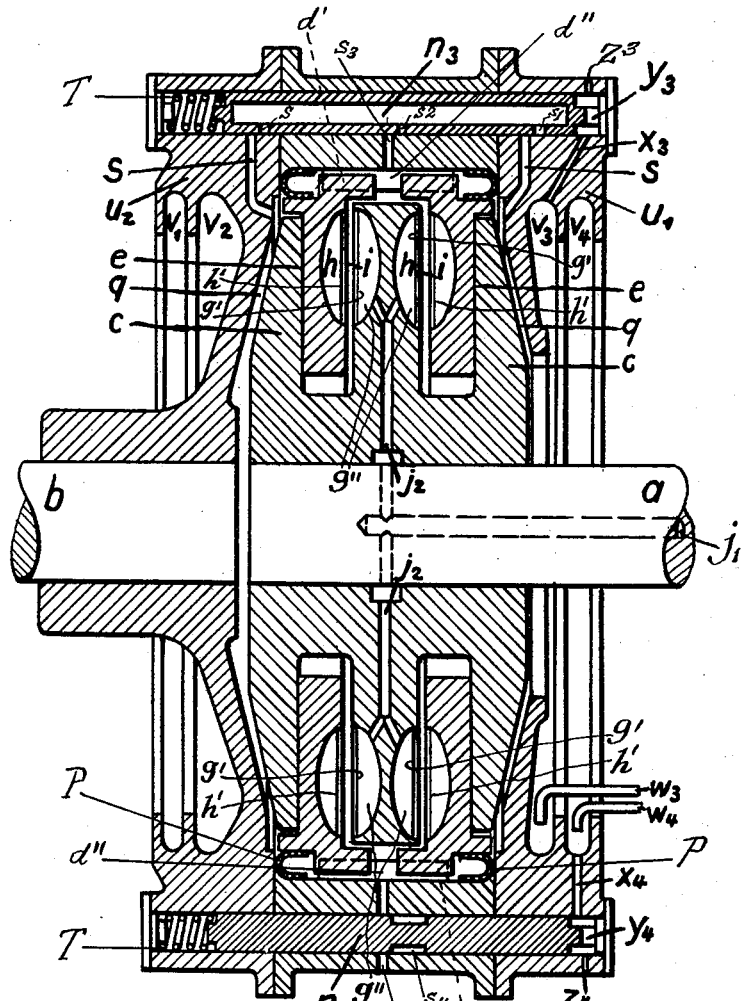
Figure 2 is an axial section on line 2—2 of Figure 3 with parts omitted.

The filling valve $n1$ is tubular with a longitudinal bore which is closed at its ends. This valve is mounted to slide in an axially-extending bore in the member $f$. It has ports $o'$ to register with channels $o$ in the member $f$, leading to the spaces $q$ between the member $f$ and head $c$; also a port $o2$ to register with a channel $o3$ in the member $f$, leading to the space $d''$ between the elements $d$, and thence to the spaces $i$ and oil pockets $h$ and $g''$. This valve also has a port $p'$ to register with a discharge port $p$ in the member $f$. This valve causes the ports of the device to be filled with working fluid as required, for starting. As shown in Figures 1 and 2, the spaces $q$ also communicate with the grooves $e$ around the circumferential edges of the head $c$.

Engaging valve $n2$, which causes engagement or connection of the parts of the device, controls ducts or channels $r$ in the member $f$ opening through the circumference of this member, and communicating with the spaces $e$ and the spaces $q$. This valve is diametrically opposite the valve $n1$; is also in an axial bore in the member $f$; and has circumferential grooves $r'$ to open the ducts $r$ when the valve is moved lengthwise to make the grooves $r'$ register with the channels $r$. The valve $n2$ is not tubular.

Between the valves $n1$ and $n2$ is a pressure compensating or equalizing valve $n3$. It is tubular with closed ends, like the valve $n1$, and is mounted to slide in a bore extending parallel to the shafts $a$ and $b$ in the member $f$. It has ports $s'$ to communicate with channels $S$, leading to the spaces $q$ above-mentioned, and a port $s2$ to register with a duct $s3$, leading to the aforesaid annular space $d''$. This valve $n3$ makes the coupling device ready for disconnection.

A fourth valve $n4$, diametrically opposite the valve $n3$, has the form of a stem, like the valve $n2$, and is parallel to the other three. This valve has a groove $s4$, and is movable lengthwise to open a channel $s5$ leading to the annular space $d''$. The valve $n4$ produces disconnection of the shafts $a$ and $b$.

During the rotation of the driving shaft $a$, oil or other fluid will be supplied through the pipe $k$. With valve $n1$ in the position shown in Figure 1 the oil flows through ducts $m$ into the nearest space $e$. As the elements $d$ are now loose in the grooves $e$, the oil flows from the nearest space $e$ through the adjacent space $q$, adjacent channel $o$, and port $o'$, into the valve $n1$, and by way of port $o2$, duct $o3$, and the other port $o'$, and channel $o$, into the space $d''$, and the other space $q$, and other groove $e$. Thus the spaces $q$ and grooves $e$ containing the elements $d$ will be entirely filled with the oil, which will be uniform in extent and under no pressure throughout the interior of the coupling device. Furthermore, the air within the coupling device will be forced out through the openings $p$ and $p'$. The valve $n1$, as by means of an expansile spring T which is permitted to be called into action in a manner as hereinafter described, is moved to close the ports $o1$, $o2$, and $p'$ after the coupling is filled with liquid and all the air has been discharged. When from openings $p$, no more air issues the valve $n1$ is closed and the liquid supply is stopped. The driving shaft $a$ may be rotated with the valve $n1$ open, and on the closing of this valve, the oil in the coupling device is whirled around by the head $c$.

At this time the liquid within the coupling, in the spaces $i$ and $d''$, attains a certain pressure due to centrifugal force. If one now opens the engaging valve $n2$, which is shown in Figure 1, in closed position, some of the liquid can leave the spaces $q$ and adjacent parts of chambers $e$ through the channels $r$ and grooves $r'$ and the friction shoes $d$ will then be impelled by the pressure of the liquid between the flange $g$ and the elements $d$ towards the opposite sides of the grooves $e$ in the head $c$ and pressed tightly against them; so that between the elements $d$ and head $c$ a frictional contact or engagement exists. The rotation of the shaft $a$ is then communicated to shaft $b$. See Figure 2. As soon as the shoes $d$ grip the head $c$, no fluid can pass out of the grooves $e$ to the spaces $q$. It is by the cooperating vane and fluid pocket arrangement of the flange $g$ and the two elements $d$ that the rotary movement of the drive shaft $a$ is transmitted to the driven shaft $b$ prior to frictional engagement between the elements $d$ and head $c$. The vanes $g'$ of the flange $g$ create a whirling motion of the fluid against the vanes $h'$ of the elements $d$ so as to impel rotation of the elements $d$. Upon the opening movement of the valve $n2$, some of the liquid from the spaces $q$ and channels $e$ is permitted to escape with the result that the elements $d$, due to the pressure of the liquid in the pockets between the flange $g$ and elements $d$, are forced axially into tight frictional contact with the head $c$.

From an inspection of Fig. 2, it will be observed that, if desired, means may be provided so that, after complete coupling, the liquid can be placed under pressure in order to obtain a greater contact pressure between the elements $d$ and head $c$. For this purpose the shaft $a$ may be provided with a bore $j^1$, from which radial bores $j^2$ lead to spaces between the flange $g$ and shoes $d$. Liquid under pressure can be forced through pipes $j^1$ and $j^2$. The coupling may be produced with or without the bores $j^1$ and $j^2$.

For the purpose of releasing the shoes $d$ and head $c$, a connection of the spaces $q$ with the spaces $i$ between the shoes $d$ and flange $g$ is obtained through channels S by means of the pressure equalizing or compensation valve $n3$; which is moved to register ports $s'$ with channels S, and the port $s2$ with the duct $s3$ and the space $d''$; thus the pressure holding the elements $d$ in tight engagement with the head $c$ is removed.

Next the valve $n3$ will be closed again, and by means of the disengaging valve $n4$ the space $d''$ is connected with the atmosphere; the valve $n4$ being moved to register its groove $s4$ with the duct $s5$. The liquid will thus be withdrawn from the grooves $e$. Hence the friction shoes $d$, on account of the pressure of the liquid remaining in spaces $q$, will be forced away from the sides of the grooves $e$ in the head $c$. The connection between shafts $a$ and $b$ is then ended.

Figure 4:
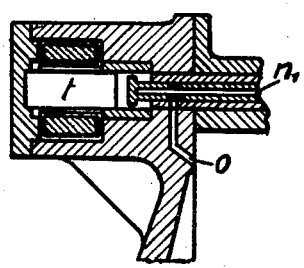
Fig. 4 represents a detail.
Figure 3:
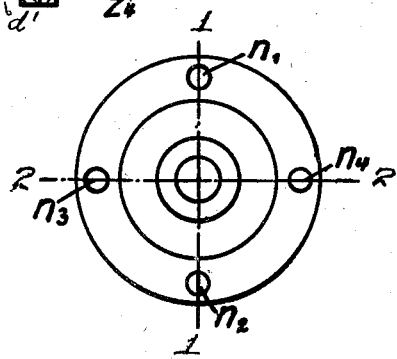
Figure 3 is a front view of the device, shown diagrammatically, to illustrate the relative location of the parts.

Each of the valves $n1$, $n2$, $n3$, and $n4$ may be closed and maintained in closed position by any suitable spring means, as by a coil expansile spring T. Against the urge of its spring, each valve may be opened either by an electromagnet or by pressure liquid. In Fig. 4, I illustrate by way of example an electromagnet $t$ in association with valve $n1$, fractionally shown. The electromagnet $t$ is arranged so that, when energized, it will draw the valve into open position, compressing the spring. Upon deenergization of the electromagnet, the spring automatically closes the valve.

In case the valves should be controlled by pressure liquid the construction may be according to Figures 1 and 2. Herein $u1$ and $u2$ indicate the opposite ends of the driven member $f$ containing, respectively, the undercut grooves or channels $v1$, $v2$, $v3$ and $v4$. Each groove has a separate supply pipe $w1$, $w2$, $w3$ and $w4$, respectively.

The figures show further the radial ducts $x1$, $x2$, $x3$, $x4$ for the grooves $v1$, $v2$, $v3$ and $v4$, respectively, through which the liquid flows into the spaces $y1$, $y2$, $y3$ and $y4$, at the ends of the valves $n1$, $n2$, $n3$ and $n4$, respectively; and is discharged therefrom by small radial openings $z1$, $z2$, $z3$ and $z4$, which extend outwardly through the member $f$. As explained, any of the valves may be opened and kept open as long as the fluid is supplied to the respective groove and will close as soon as the supply is interrupted and the space at the end of the valve where the fluid enters is emptied.

Packings or gaskets P prevent flow of fluid between the spaces $q$ and $d''$, except through the grooves $e$ containing the shoes $d$.

I claim:—

1. A coupling device comprising a driving member, a driven member, a friction element mounted to rotate with the driven member but movable axially thereof, said driving member having a space receiving said element, a pipe for supplying fluid to said space, a valve for controlling the fluid to fill said space, a second valve for controlling said fluid so that it may act under centrifugal force to cause said element to effect operative engagement with said driving member, a third valve to release said fluid to enable said element to be disconnected from said member, and a fourth valve to control the discharge of said fluid from said device.

2. A coupling device according to claim 1, wherein the driven member envelopes the driving member and the valves are carried by the driven member adjacent to circumference thereof parallel to the axis of rotation of said device.

3. A coupling device according to claim 1, wherein the valves are longitudinally movable and the driven member has undercut channels for receiving a fluid to actuate the valves, said channels communicating with the valves and the fluid for actuating same taking effect by centrifugal force.

4. A coupling device comprising a driving member, said member having annular grooves separated by a flange, a driven member enveloping the driving member, friction elements keyed to the inside of the driven member and disposed in said grooves, the driven member and the driving member being separated by spaces, a pipe to supply a fluid, the driving member having ducts to conduct such fluid to one of said annular grooves, the driven member having longitudinal bores adjacent its circumference, valves in said bores, the valves having ports and the driven member having channels to control the flow of said fluid so as to hold the fluid and cause it to act by centrifugal force to impel said elements into engagement with the driving member to enable the driving member to rotate the driven member, and to release said fluid and discharge the same from said device, the driven member having grooves at its opposite ends communicating with said valves and supply pipes for supplying a fluid to each of said grooves to acquire centrifugal force as the device rotates to actuate said valves.

5. A coupling device comprising a driving member having an annular space, a driven member carrying movably mounted friction elements in said annular space, said friction elements having a space between them for receiving a pressure fluid, whereby they may be moved by the pressure fluid into frictional engagement with the driving member, and valve means in the driven member adapted to control the admission and discharge of the pressure fluid.

6. A coupling device comprising a driving member having annular spaces, a driven member, friction elements on the driven member arranged in said spaces, said friction elements being relatively movable and forming a space between them for receiving a pressure fluid, whereby they may be moved by the pressure fluid into frictional engagement with the driving member, and valve means adapted to control the admission and discharge of the pressure fluid.

7. A coupling device comprising a driving member having an annular space, a driven member, relatively movable friction elements on the driven member arranged in said space, a flange on the driving member interposed between the friction elements and forming spaces therewith adapted to receive a pressure fluid, and means for introducing a pressure fluid into the last-named spaces to move the friction elements into frictional engagement with the driving member.

8. A coupling device comprising a driving member having an annular space, a driven member, relatively movable friction elements on the driven member arranged in the space, and forming an inner space between them and outer spaces with the driving member, a valve controlling the admission of pressure fluid into the aforesaid spaces, and a valve, other than the first-named valve, controlling the discharge of pressure fluid from said outer spaces, to permit the pressure fluid within said inner space to move the friction elements into frictional engagement with the driving member.

9. A coupling device comprising a driving member and a driven member, said driving member being provided with an annular space and a wall projecting into the space, friction elements at opposite sides of the wall and forming inner spaces therewith, said friction elements being mounted on the driven member for relative movement and adapted to be moved away from the wall into frictional engagement with the driving member, and ducts leading to the inner space and through which to conduct pressure fluid into the same to thereby effect movement of the friction elements into frictional engagement with the driving member.

10. A coupling device comprising a driving member having an annular space, a driven member carrying movably mounted friction elements in said annular space, said friction elements forming an inner space between them and outer spaces with the driving member, a valve, a supply duct for fluid leading to said outer spaces and also to said valve, a delivery duct leading to said inner space, said valve being constructed and operated to establish or prevent flow of fluid between the supply duct and delivery duct, a discharge duct associated with the supply duct and adapted when said valve prevents flow from the supply duct, to permit the discharge of fluid from said outer spaces through the supply duct and thereby to enable the fluid retained in said inner space to move the friction elements into frictional engagement with the driving member.

11. A coupling device comprising a driving member, a driven member, a friction element mounted to rotate with the driven member but movable axially thereof, said driving member having a space receiving said element, a pipe for supplying fluid to said space, a valve for controlling said fluid to fill said space, a second valve for controlling said fluid so that it may act under centrifugal force to cause said element to effect operative engagement with said driving member, a third valve to release said fluid to enable said element to be disconnected from said member, and a fourth valve to control the discharge of said fluid from said device.

12. A coupling device comprising a driving member, a driven member enclosing the driving member, a friction element mounted to rotate with the driven member but movable axially thereof, said driving member having a space receiving said element, a pipe for supplying fluid to said space, a valve for controlling the fluid to fill said space, a second valve for controlling said fluid so that it may act under centrifugal force to cause said element to effect operative engagement with said driving member, a third valve to release said fluid to enable said element to be disconnected from said member, and a fourth valve to control the discharge of said fluid from said device, said valves being carried by the driven member adjacent the circumference thereof and being disposed parallel to the axis of rotation of said device.

13. A coupling device comprising a driving member, a driven member, a friction element mounted to rotate with the driven member but movable axially thereof, said driving member having a space receiving said element, a pipe for supplying fluid to said space, a valve for controlling the fluid to fill said space, a second valve for controlling said fluid so that it may act under centrifugal force to cause said element to effect operative engagement with said driving member, a third valve to release said fluid to enable said element to be disconnected from said member, and a fourth valve to control the discharge of said fluid from said device, said valves being carried by the driven member adjacent the circumference thereof and being disposed parallel to the axis of rotation of said device, all of said valves being longitudinally movable, said driven member having undercut channels for receiving fluid to actuate the valves, said channels communicating with the valves under the effects of centrifugal force.

14. A coupling device comprising a driving member, said member having annular grooves separated by a flange, a driven member enveloping a driving member, friction elements keyed to the inside of the driven member and disposed in said grooves, the driven member and the driving member being separated by spaces, a pipe to supply a fluid, the driving member having ducts to conduct such fluid to one of said annular grooves, and driven member having longitudinal bores adjacent its circumference, valves in said bores, the valves having ports and the driven member having ducts to control the flow of said fluid so as to hold the fluid and cause it to act by centrifugal force to impel said elements into engagement with the driving member to enable the driving member to rotate the driven member, and to release said fluid and discharge the same from said device, the driven member having undercut channels at its opposite ends communicating with said valves and supply pipes for supplying a fluid to each of said grooves to acquire centrifugal force as the device rotates to actuate said valves.

15. A coupling device comprising a driving member with a flange and an engaging member forming a space and a separate friction element disposed in the space for axial movement between the flange and engaging member, together with vanes and pockets provided on the flange and friction element between the adjacent faces thereof, the pockets being constructed between the vanes and adapted to receive fluid, said driving member and friction element being rotatable and said vanes and pockets being adapted, on the rotation of the driving member, to whirl the fluid in a direction to move the friction element axially into tight frictional contact with the engaging member whereby through said contact to rotate said friction element by the driving member.

16. In a coupling device, a driving member formed with a space between a flange and an engaging part, a friction element accommodated in the space and adapted to be moved axially therein to make frictional contact with the engaging part, the space between said flange and friction element adapted for receiving a fluid, and means adapted, on the operation of the driving member, to act on the fluid and cause the fluid to force the friction element axially into frictional contact with the engaging part, said means comprising alternating vanes and fluid-receiving pockets on the adjacent faces of said driving member and friction element.

In testimony that he claims the foregoing as his invention, he has signed his name hereto.

JACOB LELL.